United States Patent
Watts

[15] 3,675,428
[45] July 11, 1972

[54] METHOD AND APPARATUS FOR WASTE DISPOSAL

[72] Inventor: James P. Watts, 6930 East Pinchot, Scottsdale, Ariz. 85251

[22] Filed: Sept. 23, 1970

[21] Appl. No.: 74,601

[52] U.S. Cl. ............................................. 61/35, 61/53.64
[51] Int. Cl. ................................................. E02d 15/00
[58] Field of Search ............... 61/35, 36, 46, 53.52, 53.64

[56] References Cited

UNITED STATES PATENTS

| | | | |
|---|---|---|---|
| 3,499,293 | 3/1970 | Kato | 61/35 X |
| 3,352,115 | 11/1967 | Jurisich | 61/35 |
| 3,282,055 | 11/1966 | Landau | 61/36 R |
| 3,511,056 | 5/1970 | Jones et al. | 61/35 |
| 2,818,682 | 1/1958 | Finn | 61/35 X |
| 3,557,685 | 1/1971 | Schroering | 61/35 UX |

Primary Examiner—David J. Williamowsky
Assistant Examiner—Philip C. Kannan
Attorney—Eric P. Schellin and John A. Robertson

[57] ABSTRACT

A method and apparatus for waste disposal whereby an encased helical auger may be used sequentially for creating voids in the soil and for compacting waste material in said voids; dump bin and conveyor means for feeding waste material to said encased auger and means for scattering earthen material over a considerable area of the ground after it has been removed from the earth by said auger for covering voids previously filled with waste material.

10 Claims, 9 Drawing Figures

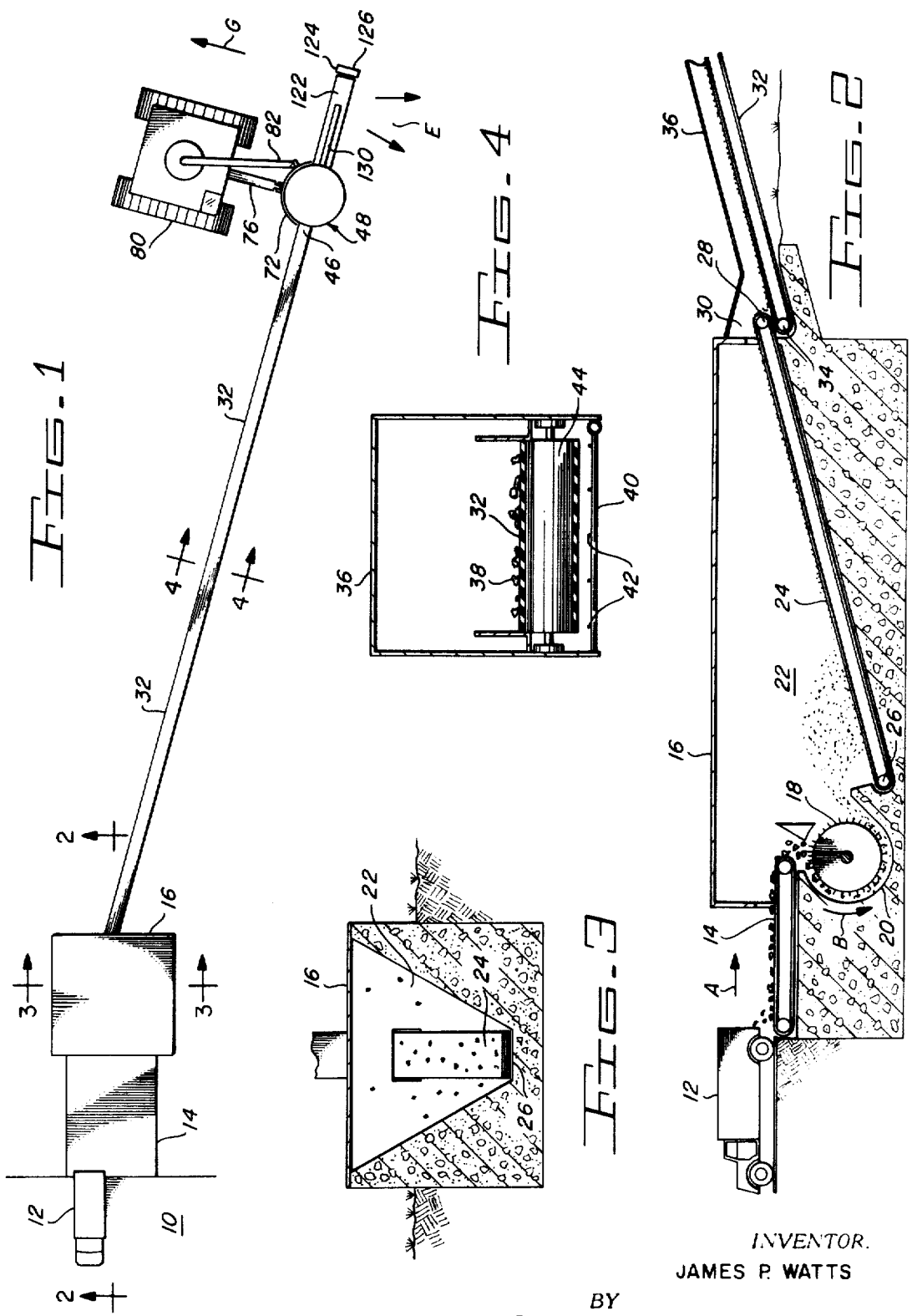

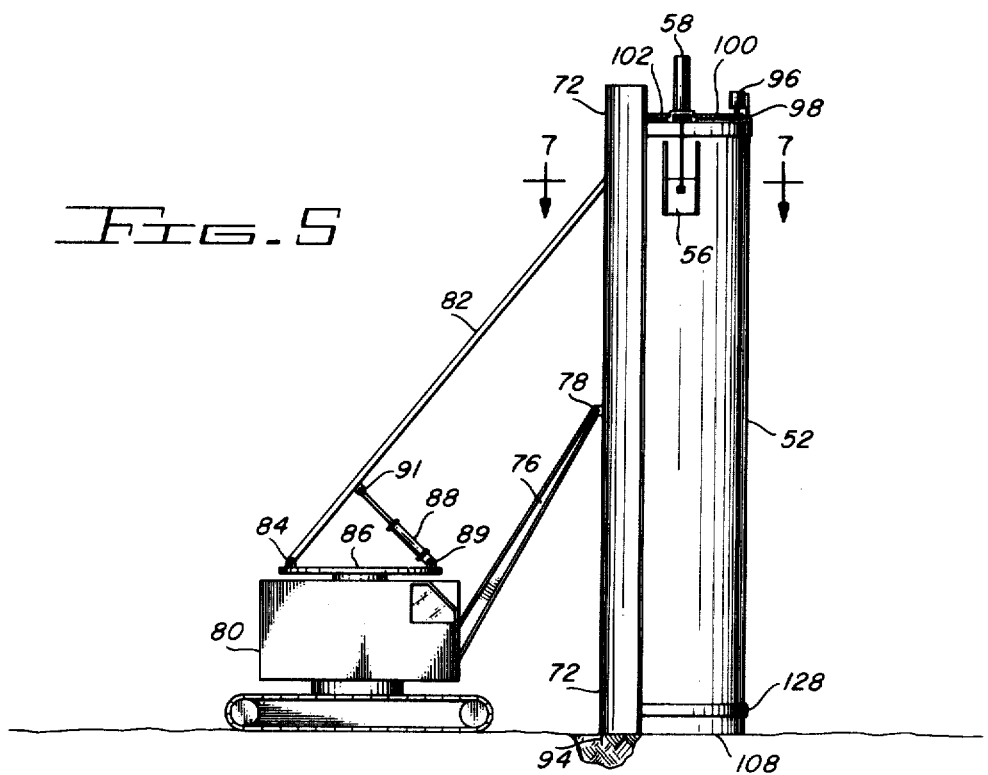
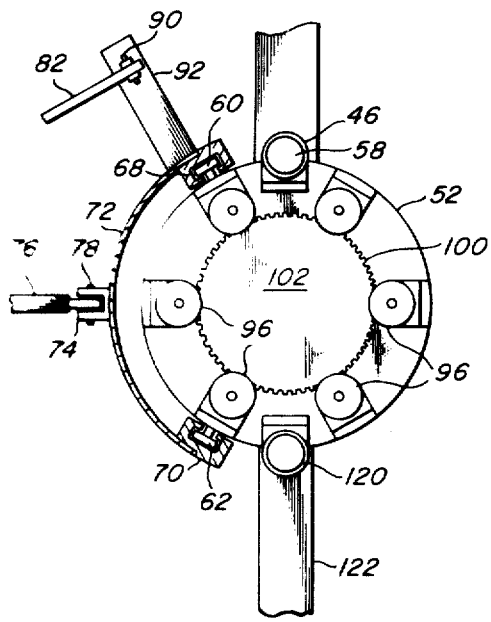
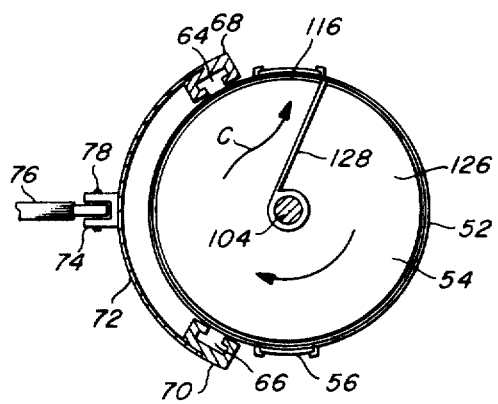
INVENTOR.
JAMES P. WATTS

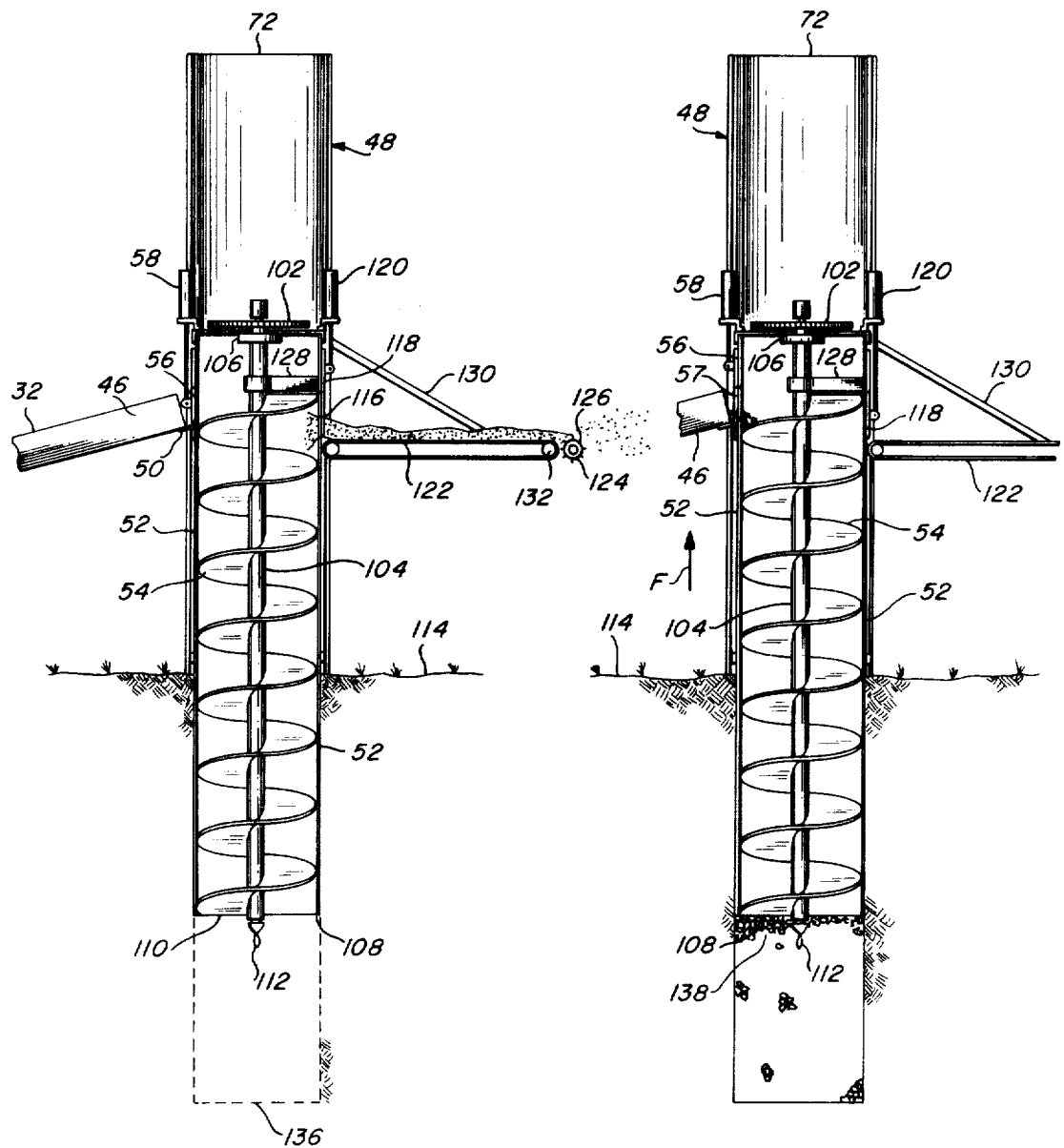

METHOD AND APPARATUS FOR WASTE DISPOSAL

Waste material such as trash and garbage has been disposed of by means of various apparatus and methods; however, the usual practice comprises the digging of large pits by means of bulldozers then dumping waste material in such pits and then covering the water material with soil. Accordingly, it is recognized that disposal of waste material in pits requires a considerable amount of skilled heavy equipment operation to move the soil about for deep burying of waste material. Ordinarily, prior art methods provide for roadway access of the general public to a large pit area in which an unsanitary condition exists. Trucks are driven into such pits wherein waste material may be in the various stages of decay and such areas are infested with insects and various harmful microorganisms. The general public visits these areas with their small trucks and trailers and in many instances the operators of vehicles dumping waste material into such areas walk in the material during the unloading of their particular vehicle. It is believed that such unsanitary waste handling methods tends to spread disease and harmful microorganisms.

In accordance with the present invention, a novel method and apparatus is provided for deep burying and disposal of waste material without substantial exposure of said waste material to insects, animals or human beings in the area where the waste material is buried in the soil. Specifically, the invention comprises a novel method and apparatus for waste disposal whereby an encased helical auger may be used sequentially for creating voids in the soil and for compacting waste material in said voids as the auger is withdrawn or compressively driven therefrom by the compaction of waste material in said void. The invention also provides novel means for scattering earthen material over a considerable area while the auger of the invention creates a void in the soil and the scattering of this earthen material tends toward uniform layering of the soil over previously formed voids which have been filled with waste material. Additionally, the invention comprises a novel dumping dock and bin structure which automatically conveys the waste material away from vehicles which transport the waste material thereto so that operators of waste transport trucks do not need to come in contact with any waste materials previously deposited in the area of said bin. Further, the invention comprises a short conveyor which carries waste material from an area adjacent a vehicle unloading area to a shredder and pulverizer which efficiently reduces waste material to a substantially uniform pyrical size so that it may efficiently be compacted into a void in the earth by a helical auger of the invention.

Accordingly, it is an object of the invention to provide a very sanitary and efficient method and apparatus for waste disposal.

Another object of the invention is to provide a novel method and apparatus for waste disposal whereby an encased helical auger may be used sequentially for creating voids in the earth and for compacting waste material in said voids.

Another object of the invention is to provide a novel means for scattering earthen material removed from the earth while creating voids therein by operation of the auger of the invention so that the earthen material may be scattered over a large area wherein voids have previously been filled with waste material by means of the invention.

Another object of the invention is to provide a novel combination of a waste receiving bin, movable conveyor and a vehicle supportable and movable encased auger whereby waste material may be received and handled efficiently and in a sanitary manner during the burying thereof.

Further objects and advantages of the invention may be apparent from the following specification, appended claims and accompanying drawings.

FIG. 1 is a top or plan view of an apparatus for waste disposal to be used in relation to the method of the present invention;

FIG. 2 is an enlarged fragmentary sectional view taken from the line 2—2 of FIG. 1 showing a waste material receiving bin and handling apparatus of the invention;

FIG. 3 is an enlarged fragmentary sectional view taken from the line 3—3 of FIG. 1;

FIG. 4 is an enlarged cross-sectional view taken from the line 4—4 of FIG. 1 showing details of the waste material conveyor of the invention and means for enclosing the conveyor for sanitary purposes;

FIG. 5 is a side elevational view of the apparatus shown in FIG. 1 of the drawings;

FIG. 6 is a fragmentary top or plan view showing the auger casing and some of the supporting structure therefor on enlarged scale;

FIG. 7 is an enlarged fragmentary plan sectional view taken from the line 7—7 of FIG. 5;

FIG. 8 is a vertical sectional view taken through the auger and auger casing mechanism of the invention showing this mechanism removing soil from the earth to form a void therein and showing means of the invention scattering earthen material over the upper surface of the ground as it is removed from the soil to form a void therein; and FIG. 9 discloses the auger and casing mechanism of the invention operating sequentially from that as shown in FIG. 8 to perform the filling of a void with waste material and the compaction of waste material in said void as the auger mechanism of the invention drives itself together with its casing upwardly out of a void previously formed in a manner as disclosed in FIG. 8 of the drawings.

As shown in FIGS. 1 and 2 of the drawings, the invention comprises apparatus which is used to perform the method steps of the invention as will be hereinafter described. This apparatus as shown in FIGS. 1 and 2 of the drawings, comprises a truck supporting structure 10 which may be at the side of the roadway. This structure 10 may be in the form of a ramp or a level platform and is adapted to support waste laden trucks 12 which may be used to transport waste material to an area in which the method and apparatus of the invention may be employed. Adjacent the vehicle support 10 is a wide belt-type conveyor 14. This conveyor is a conventional endless conveyor and may be sufficiently wide so that several vehicles such as the vehicle 12 may be parked side-to-side and concurrently unload onto the conveyor 14. This conveyor 14 moves waste material thereon in a direction of an arrow A as shown in FIG. 2 of the drawings, and carries the waste material into an enclosed housing 16 wherein it falls into a shredder and pulverizer 18. The shredder and pulverizer 18 is located in a recess 20 at one end of a concrete bin 22. The shredder operates generally in the direction of an arrow B as shown in FIG. 2 of the drawings, and ejects shredded and pulverized material onto an upper surface of an endless conveyor 24 which is rotatably carried by rollers 26 and 28.

As shown in FIG. 3 of the drawings, the cross-sectional shape of the bin 22 is downwardly converging to a portion 26 thereof which is substantially equal to the width of the belt conveyor 24.

The housing 16 at one end thereof is provided with a covered opening 30 through which the conveyor 24 extends. The roller 28 supporting the conveyor 24 overlies a secondary section 32 of the conveyor. This section 32 is an endless conveyor having a supporting roller 34 disposed beneath the conveyor 24 and in overlapping relationship therewith so that the conveyor 32 may pivot substantially about a vertical axis with relation to the housing 16 and bin 22.

As shown in FIG. 4 of the drawings, the conveyor section 32 is provided with a casing 36 adapted to enclose the conveyor 32 so that a sanitary condition is maintained with respect to waste material 38 carried on the conveyor 32.

Located beneath the conveyor 32 is a manifold 40 having an upwardly directed jet nozzles 42 adapted to wash the conveyor 32 as it moves thereover. A conveyor belt supporting roller 44 is shown in FIG. 4 of the drawings and it cooperates with the roller 34 shown in FIG. 2 of the drawings for carrying the conveyor belt 32.

It will be understood that the conveyor belt 32 is a substantially conventional belt of an industrial or conventional type.

A delivery end 46 of the conveyor 32 is pivotally supported in connection with a cylindrical casing 48 of auger mechanism of the invention as shown in detail in FIG. 8 of the drawings. The end 46 of the conveyor 32 is supported by a hinge 50 in connection with a hollow cylindrical casing 52 which contains a helical auger 54 rotatably mounted in the casing 52.

A door 56 is slidably operable to uncover an opening in the side wall of the casing 52. This door is actuated by a hydraulic cylinder 58 adjacent to a delivery end 46 of the conveyor 32 so as to admit waste material into the interior of the casing 52 in communication with the auger 54 as will be hereinafter described.

As shown in FIG. 6 of the drawings, the casing 52 is provided with T-shaped in cross section track followers 60 and 62 which are movable vertically in T-shaped in cross section slots 64 and 66 of normally vertical tracks 68 and 70. The tracks 68 and 70 are coupled together by an arcuate frame 72 having a clavis portion 74 pivotally connected to an arm 76 by means of a pin 78. The arm 76 is a crane-type boom structure operable in connection with a vehicle 80 which is a tractor-like vehicle and the arm 76 is operable in substantially the same manner as the boom of a conventional crane.

Another crane-like arm 82 is pivotally mounted at 84 on a turntable 86 carried on a vertical pivotal axis in connection with the vehicle 80. Mounted on this turntable 86 is a hydraulic cylinder 88 which is pivotally mounted by a pin 89 on the turntable 86 and a plunger of the hydraulic cylinder 88 is pivotally connected by means of a pin 91 to the arm 82.

An upper end portion of the arm 82 as shown in FIG. 6 of the drawings, is pivotally mounted by means of a pin 90 to a brace arm 92 and this brace arm 92 is connected to the frame 72 so that the arm 82 and the arm 76 provide triangulation support for the frame 72 for maintaining it in a substantially vertical disposition.

The frame 72 at its lower end is provided with a spike 94 adapted to be impaled into the surface of the ground for maintaining lateral support of the frame 72 when the auger 54 starts to proceed downwardly together with the casing 52 as will be hereinafter described.

As shown in FIGS. 5 and 6 of the drawings, a plurality of high torque reduction gear motors 96 are mounted on a normally upper end of the casing 52. These motors are provided with output shafts carrying pinion gears 98 which mesh with peripherally located gear teeth 100 on a large ring gear 102. The motors 96 with their pinions 98 tend to rotate the ring gear 102 which is connected to an auger shaft 104 as shown best in FIGS. 8 and 9 of the drawings. This auger shaft is carried in a thrust bearing 106 at the upper end of the casing 52 in order to prevent substantial axial displacement of the auger shaft 104 relative to the casing 52. The helical auger 54 is fixed to the shaft 104 and the casing 52 is provided with a normally lower open end 108. The auger 54 is provided with a cutting edge 110 disposed at said opening 108 of the casing 52 and also the lower end of the auger shaft 104 is provided with a pilot auger 112 adapted to start or pilot operation of the auger 110 as it proceeds downwardly into the soil below an upper surface 114 thereof as shown in FIGS. 8 and 9 of the drawings. The casing 52 is provided with an outlet opening 116 adapted to be enclosed by a door 118 vertically slidably operable by means of a hydraulic cylinder 120 similar to the cylinder 58 either to actuate the door 56 hereinbefore described.

Communicating with and extending from the opening 116 is an endless conveyor 122 adapted to deliver earthen material to a scattering device 124. This scattering device may be a high speed rotary member of cylindrical shape operating on a substantially horizontal axis and rotatable to move radial projections 126 thereof at high speed so as to fling earthen material a considerable distance from the area of the casing 15 and to scatter the earthen material over a fairly wide area as the earthen material is removed from the earth by the auger 54 as will be hereinafter described in detail.

As shown in FIG. 7 of the drawings, an upper end portion 126 of the auger 54 operates adjacent to a bar 128 which is located at one side of the outlet opening 116 in the casing 52. Thus, earthen material moved upwardly in the casing 52 by the auger 54 follows generally a direction as indicated by an arrow C in FIG. 7 of the drawings, and passes outwardly through the opening 116 onto the conveyor 122.

The T-shaped track followers 60 and 62 are disposed normally at the upper end of the casing 52 and a lower end of the casing 52 is slidably movable through a guide band 128 carried by the frame 72 and surrounding the lower end of the casing 52 near its open portion 108.

While the casing 52 may be projected downwardly into the soil and removed therefrom, the end 46 of the conveyor 32 must move upwardly and downwardly concurrently with the casing 52 and the conveyor 122 must likewise move up and down with the casing 52. The hinge 50 supports the end 46 of the conveyor 32 in connection with the casing 52 while angular brackets 130 extend outwardly and downwardly from the casing 52 to support an outboard end 132 of the conveyor 122 all as shown best in FIGS. 8 and 9 of the drawings. The scattering device 126 may rotate on a horizontal axis disposed at various angles near the end 132 of the conveyor 122 so as to direct soil as indicated by arrows E in FIG. 1 of the drawings. The scattering device 126 may be oriented to scatter earthen material in various directions as desired in accordance with the direction of movement of the vehicle 80 and the casing 52 together with the auger 54 for successively creating voids in the earth as will be hereinafter described in detail.

As shown in FIG. 8 of the drawings, the auger 54 and casing 52 are projected downwardly into the earth below its surface 114 to create a void therein, the bottom area of which may be disposed as indicated by broken lines 136. During progressive movement of the auger 54 and casing 52 downwardly into soft soil, the casing is held against rotation and is moved slidably with relation to the tracks 68 and the auger 54 is restrained against axial movement relative to the casing 52 so that its soil working end is disposed substantially at the open end 108 of the casing 52. During helical progression of the auger 54 downwardly into the earth, earthen material is carried upwardly to an area of the guide band 128 and is projected outwardly through the opening 116 onto the conveyor 122 which delivers the earthen material to the scattering device 124 which as hereinbefore described scatters the soil in any one of several desired directions depending upon the disposition of the axis of the scattering device 124.

When the end 110 of the auger has reached the extremity of its travel as indicated by broken lines 136 in FIG. 8, a substantial void has been created in the earth and at this time, the door 118 may be actuated by the cylinder 120 to close the outlet opening 116. At this time, the door 56 may be opened by the cylinder 58 to open the inlet opening 57 shown in FIG. 9 of the drawings to admit shredded and pulverized waste material to be delivered into the interior of the casing 52 and onto the auger 54. At this time, the operation of the motors 96 is reversed as compared to the operation of the auger in the direction as shown in FIG. 8 of the drawings, so that the waste material in the casing 52 is compacted at 138 in the void in the soil previously created in accordance with the operation of the auger as shown in FIG. 8 of the drawings.

It will be appreciated that when the auger 54 has been projected into the earth to form a void and after the earthen material has been scattered by the scattering device 124, the auger 54 remains in the void together with the casing 52 for subsequent introduction and compaction of waste material in the area 138 under the auger 54. During reverse helical operation of the auger 54 and during compaction of the waste material in the void area 138, the auger and casing is compressively driven upward in a direction as indicated by an arrow F in FIG. 9 of the drawings. When the void has been filled by the waste material at 138 to a level of the ground surface 114, the casing 52 and auger 54 may be moved by means of the vehicle 80 to a new and adjacent location at which a new void may be created and filled with waste material.

As for example, the vehicle may move in the direction of an arrow G as shown in FIG. 1 of the drawings, and the scattering device 124 may be oriented to move or scatter earthen material in the direction of the arrow E so as to cover a broad area of the ground surface over previously created and filled voids so that the waste material in such voids may be covered over by the soil projected from the scattering device 124.

The method of the invention as performed in relation to the hereinbefore disclosed apparatus comprises broadly the creation of a encased auger then projecting the encased auger into the earth to form a void therein by driving the auger in one rotary direction while removing earthen material from the casing surrounding the auger, then reversing operation of the auger and introducing waste material thereinto such that the auger then drives the waste material downwardly into the void in the soil and compacts it therein and thus compressively drives the auger and casing out of the soil. The method also comprises the use of the earthen material being removed from a void area in the earth and scattering the earthen material over the area in which voids have been previously created and filled with waste material by the encased auger structure of the invention.

It will be obvious to those skilled in the art that a great many modifications of the structures may be resorted to without departing from the spirit of the invention and from the method of the invention.

I claim:

1. In apparatus for forming a vertical void in the ground and filling said void with waste material which is compacted in the void, the combination of:
   a. a vertical frame having ground engaging means at its lower end which holds the frame against rotation relative to the ground;
   b. supporting members engaging said frame at points spaced above its lower end which also hold the frame against rotation relative to the ground;
   c. a vertical track on said frame;
   d. a cylindrical casing having an upper end and an open lower end;
   e. a track follower on said casing and cooperating with said track;
   f. an auger rotatably mounted in said casing;
   g. means for preventing relative rectilineal movement between said auger and casing;
   h. power means for rotating said auger in either of two directions of rotation;
   i. a lateral opening in said casing through which waste material is introduced thereunto; and
   j. a second lateral opening in said casing through which soil excavated by the auger is discharged, whereby said auger is rotated in one direction to form a vertical void in the ground with the soil which is removed as an incident to forming the void is discharged through said second lateral opening and the casing together with the auger is moved downwardly into the void, whereupon the auger is operated in a reverse direction while waste material is introduced into the casing through the first lateral opening to cause said waste material to be compacted in the void while the casing and auger are moved upwardly of the void.

2. The apparatus of claim 1 together with means associated with said second lateral opening for scattering earth discharged therefrom.

3. The apparatus of claim 1 together with a vehicle on which said supporting members are mounted.

4. The apparatus of claim 1 together with a conveyor for delivering waste material to said first lateral opening.

5. The invention as defined in claim 1 wherein a waste dump bin communicates with said conveyor; said conveyor being pivotally movable relative to said dump bin to permit said casing and said auger progressively to be moved laterally from one location to another.

6. The invention as defined in claim 5 wherein a shredder and pulverizer is disposed to process waste material between said dump bin and said conveyor.

7. The invention as defined in claim 6 wherein said conveyor is provided with a cover for the maintenance of sanitary conditions between said bin and said casing as said conveyor transports waste material into said casing.

8. In the disposal of waste material, the method comprising the steps of:
   a. positioning a vertical frame including a vertical track at a desired location on the ground and fixing the frame against rotation relative to the ground;
   b. assembling a cylindrical casing having an auger rotatably mounted therein and held against rectilineal movement relative to said casing on said frame with a track follower on the casing engaging said track;
   c. rotating said auger under power in one direction to form a vertical void in the ground and while so doing moving the casing and auger as a unit into the void and discharging soil removed from the ground through a lateral outlet in said casing;
   d. then introducing waste material into said casing through a lateral inlet and at the same time rotating said auger under power in a reverse direction to charge the waste material into the void and compact it therein with the casing and auger being forced upwardly as the void is filled with the compacted waste material.

9. The invention as defined in claim 8 wherein the removal of said earthen material comprises the scattering thereof over a substantial area of the ground laterally relative to said casing.

10. The invention as defined in claim 9 wherein a plurality of said voids are progressively formed and filled with waste material while the scattering of said earthen material is directed over previously formed voids which have been filled with waste material.

* * * * *